Sept. 29, 1925.  
W. HAHNEMANN  
ELECTROMAGNETIC SOUNDING APPARATUS  
WITH TWO EXCITING WINDINGS  
Filed April 8, 1921   3 Sheets-Sheet 1

Inventor  
Walter Hahnemann  
by Knight Bro.  
attorneys

Patented Sept. 29, 1925.

1,555,366

UNITED STATES PATENT OFFICE.

WALTER HAHNEMANN, OF KITZEBERG, NEAR KIEL, GERMANY, ASSIGNOR TO THE FIRM SIGNAL GESELLSCHAFT M. B. H., OF KIEL, GERMANY.

ELECTROMAGNETIC SOUNDING APPARATUS WITH TWO EXCITING WINDINGS.

Application filed April 8, 1921. Serial No. 459,929.

*To all whom it may concern:*

Be it known that I, WALTER HAHNEMANN, citizen of the German Republic, and residing at Kitzeberg, near Kiel, county of Schleswig-Holstein, State of Prussia, Germany, have invented certain new and useful Improvements in Electromagnetic Sounding Apparatus with Two Exciting Windings, of which the following is a specification.

In the operation of electromagnetic transmitting apparatus for sound waves operated by means of alternating currents, as a rule, a direct current is employed for the production of a magnetic field (polarization). This auxiliary excitation can indeed be dispensed with and the sounding apparatus be operated unpolarized if it only has to serve as a transmitter. If, however, it also has to be used as a receiver at the same time the polarization must be maintained for the reception in any case. So long as a direct current source of any desired suitable voltage can be selected for this polarization no difficulties arise. If, however, it is necessary to employ an existing source of potential, for example the existing main voltage in ships' installations for submarine sounding the potential of which, as a rule, is two high, then the polarization winding must be provided with a large number of turns in order to avoid the insertion of resistances using up energy. In consequence of this, such a high voltage is induced in these windings that it is scarcely possible to insulate the conductors to these windings in a secure manner.

The invention is concerned with an electromagnetic sounding apparatus provided with two windings which are operated without polarization currents during transmitting and aim at the object of avoiding an induced current in the windings which are not used during transmitting. The invention consists in the feature that one of the two windings is sub-divided and its parts are connected in opposition. The arrangement can be so devised that the connection of the parts of the winding is fixed beforehand or that the parts or groups of the winding are furnished with separate leads which are connected with a switching device which allows them to be connected at will either in the same direction or in opposition. By means of the connection of the parts of the one winding in opposition the effect is produced that during transmission no alternating currents or at least only a greatly diminished alternating current is induced in the winding which is not used during transmission.

Figure 1:
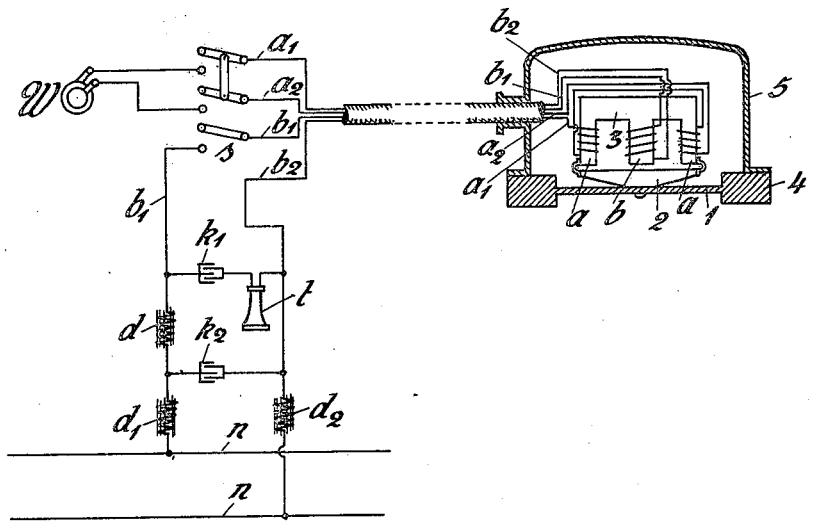
Figure 2:
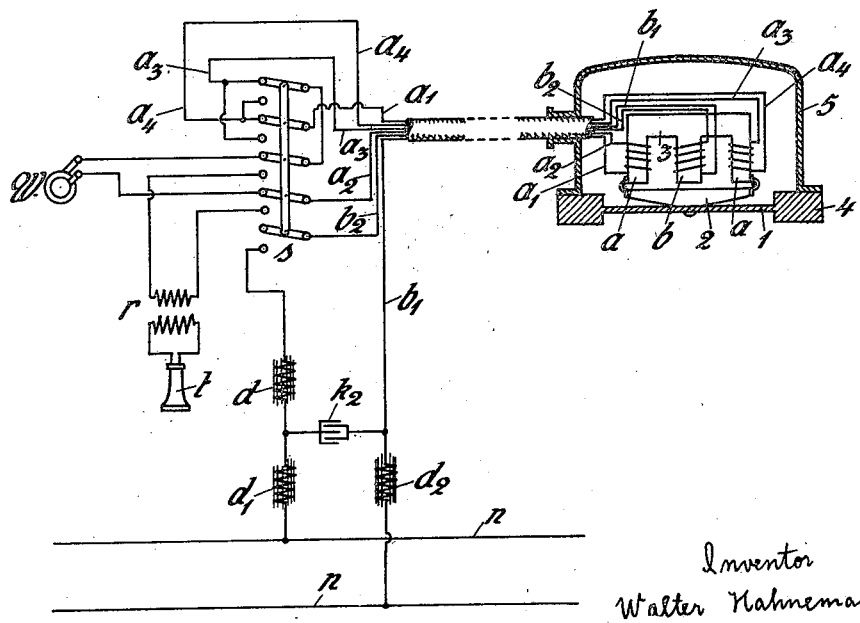
Figure 3:
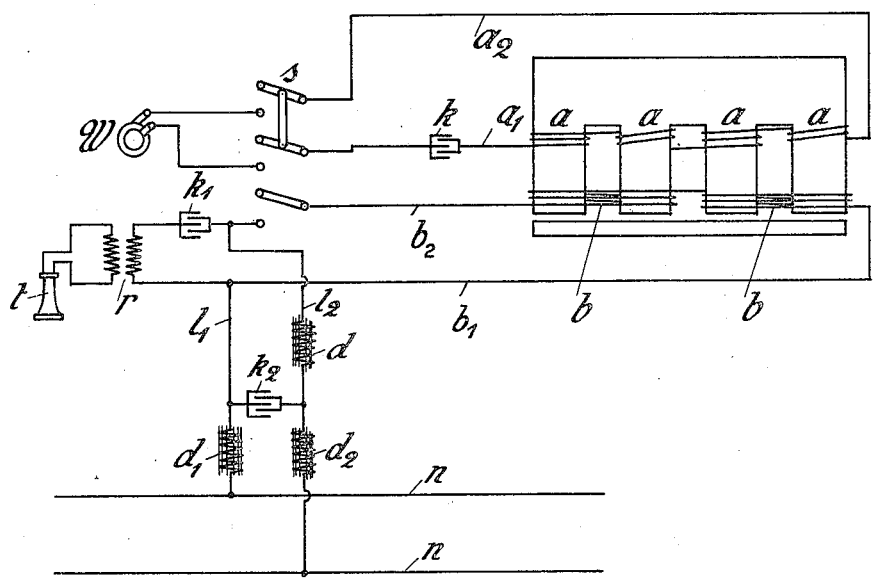
Figure 3A:
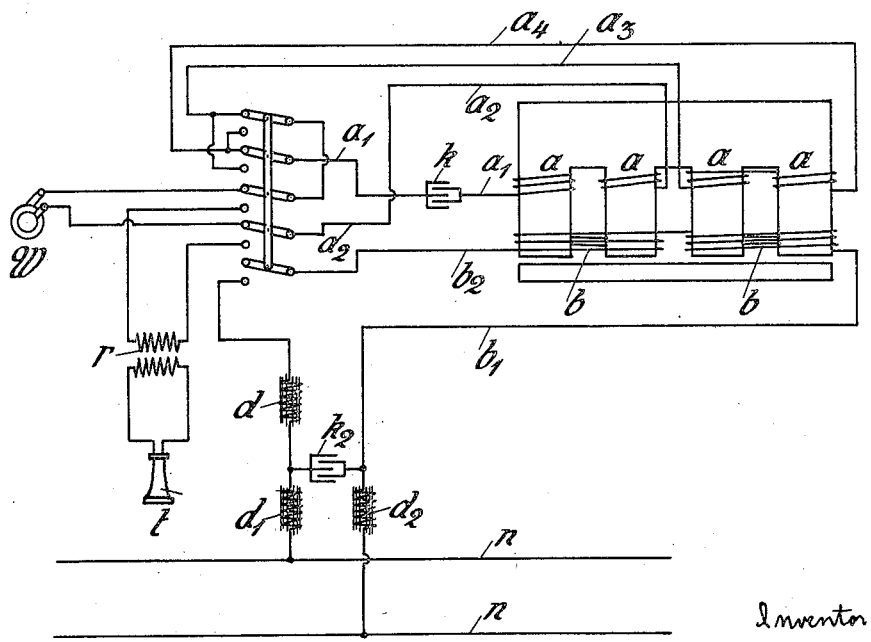
Figure 4:
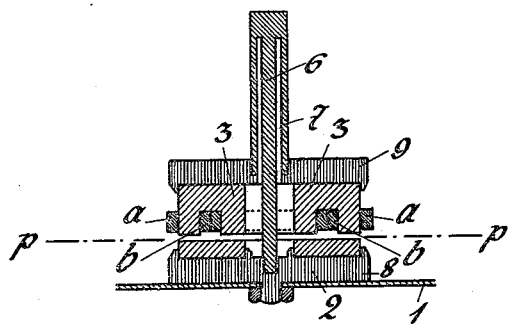
Figure 5:
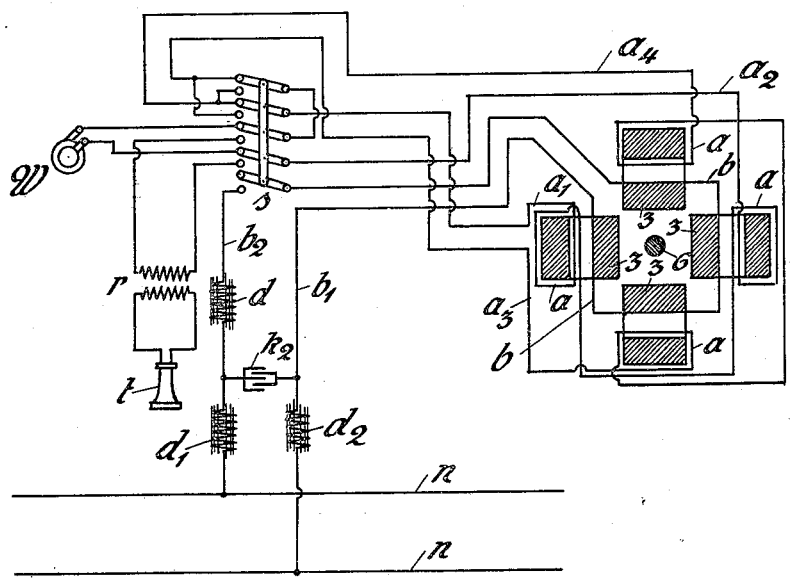

The invention is diagrammatically illustrated in a few examples in the drawing, which shows in Fig. 1, a sounding apparatus with three-core magnets and with the subdivided winding permanently connected in opposition beforehand; in Fig. 2 an apparatus of the same kind in which the parts of the winling are separately led out and are capable of being connected as desired. Fig. 3 shows a sounding apparatus with a four-core magnet and permanently connected parts of the winding. Fig. 3ª shows a specific modification of Fig. 3. Figs. 4 and 5 show a sounding apparatus assembled from four magnet systems likewise with the parts of the winding permanently connected.

The sounding apparatus is formed by means of a diaphragm 1 in Fig. 1 which carries the armature 2 of an electro-magnet 3. The diaphragm is fixed to the annular flange 4 of a dome 5 which covers this dome after the fashion of a lid. The middle of the three magnet cores carries a coil $b$. The two outer cores each carry a coil $a$ which latter are connected in series so that their fluxes neutralize one another in the core. When thus connected either the coil $b$ or the coils $a$, as desired, may be energized by the alternating current for transmission. Since, however, the coil $b$ serves for receiving the polarizing current and therefore has a large number of turns preferably the coils $a$ are used for transmitting. They are connected to the alternating current source $w$ by means of the leads $a_1$, $a_2$ to the switch $s$. The coil $b$ is joined to the direct current mains $n$, $n$ through the conductors $b_1$, $b_2$ and the choking coils $d_1$, $d_2$. In front of the choking coils $d_1$, $d_2$ the conductors are bridged by a condenser $k_2$. The group $k_2$, $d_1$, $d_2$ serves for neutralizing the commutator current ripples of the machine supplying the mains. The telephone $t$ is connected to a plate condenser $k_1$ at $b_1$, $b_2$ and in one of the conductors to the mains in this case in $b_1$ there is connected in front of $k_2$ a choking coil for choking back the receiver alternating current.

In the example of Fig. 2, both parts of the winding $a$ are provided with divided tappings $a_1$, $a_2$ and $a_3$, $a_4$ and are so connected to a switching device *s* by means of $b_2$ that in the transmitting position as shown in the figure, the parts *a* of the winding are connected in opposition and the conductor $b_2$ is interrupted. In the receiving position $b_2$ is connected so that the winding *b* is supplied with currents from the mains while the parts of the windings *a* are connected in series in the same direction. The telephone is in this case connected to the coil *a* through a transformer *r*.

The four core magnet of Fig. 3 possesses four parts *a* of the winding and a second winding similarly sub-divided into the parts *b*. The coils are so wound that the flux of each of the pairs of coils *a* belonging to a coil *b* assist with reference to the coil *b* arranged upon it as is shown in Fig. 3ª. In this case as in Figure 1 the group of coils *a* serves for transmitting and the group of coils *b* at the same time for polarizing and receiving. Naturally also in this case a system of connection can be employed corresponding to that in Fig. 2. The telephone is connected to the respective magnet windings through a transformer *r*. This transformer connection is also necessary in the case of a large number of turns in the respective coils if telephones of a very high resistance are employed. In one of the conductors $l_1$, $l_2$ leading to the mains a choking coil *d* is again inserted. The condenser *k* in the conductor *a*, serves for electrically tuning the transmitting circuit.

Figs. 4 and 5 show diagrammatically in an axial longitudinal section and in a section through the line *p*, *p*, of Fig. 4, a magnet system sub-divided into four parts, the parts of which are arranged concentrically about a system consisting of a stem 6 and a tube 7 and which serves as an elastic connecting link. The armature and field magnets of the magnet system are carried by the plates 8 and 9. The stem is fixed at 8 and the tube at 9 and the armature and field magnets oscillate with respect to one another upon exciting the system so that the stem and the tube are subjected to extension and compression in longitudinal direction. The conducting leads to the coils are visible in a particularly simplified form in Fig. 5. Whilst the coils *b* extend through all four parts of the magnet, the second coil consists of four portions *a* of a winding arranged on each part of the field magnet and wound alternately in opposite directions throughout the series.

The coils can be connected in the operating connection according to Fig. 1 or 2; in the latter case each of the two opposite coils of a pair must be connected in series and must be separately led out to a switching device similar to that illustrated in Fig. 2. The number of coils can be increased according to the greater or smaller number of sub-divisions of the magnet. If the magnet field is divided into an odd number of parts one of the parts of the winding can again be sub-divided in a corresponding manner into oppositely connected parts or in case of need one of the coils can be switched out.

In the examples shown in the figures the following three cases are especially of interest.

If the sub-divided winding *a* is only led out of the apparatus at its end points so that its parts cannot be connected up at will then it can only serve as a transmitting coil because during unpolarized transmission the polarity of the magnet cores opposite the armature of the magnet is immaterial. It has therefore the lower number of turns adapted for the alternating current voltage. The coil *b* during reception conducts the direct current as well as the induced alternating current and has a large number of turns suited to the high direct current voltage.

If the two oppositely connected groups of coils *a* are led out of the apparatus by means of separate conductors so that they are capable of being connected at will in the same directions and in opposite directions, then two cases arise. If the sub-divided winding *a* is to be used for transmission it has the lower number of turns and during transmission its parts are connected in opposition in order to produce no field for the other winding. During reception its parts are connected in the same direction and the alternating current is taken from it while the winding *b* having a higher number of turns is connected to the high voltage direct current source.

If the winding *b* which is not sub-divided is to be used for transmission it has the lower number of turns. The groups of the sub-divided windings must be connected in opposition during transmission, during reception the groups of the sub-divided windings are connected in the same direction and are connected to the high voltage source of direct current while the receiving alternating current is taken from the winding which is not sub-divided.

The bringing into prominence of the three cases illustrated does not exclude the possibility of other methods of connection according to the invention. Also it is not necessary that the sub-division of the one coil must be externally perceptible but rather this effect can be produced by suitably arranging the windings of both kinds in the same winding space. Finally also no complete uniformity in the fields of the parts of the winding connected in opposition is necessary but rather it is sufficient if the remaining induction due to the connection in opposition is so far reduced that the insulation of the leading out conductors presents no particular difficulty.

The connections of the coils and the other connecting elements are preferably, as is illustrated in one part of the figures, effected by means of a switching device combined in a switchboard so that all switching connections can be effected as far as possible with a single movement of a switch.

I claim:

1. In an electromagnetic sound signalling apparatus for sending and receiving sounds, the combination of an exciting coil, a polarizing coil and an electromagnet core system common to both coils, an armature for said core system and a diaphragm operatively connected with said armature, one of said coils being sub-divided into several portions, a switching device and electrical connections between said device and said coils and the subdivisions thereof for connecting the coil subdivisions in series with or opposite to each other, to increase or neutralize respectively their electromagnetic effect.

2. In a sound signalling apparatus, an electromagnet, and two exciting coils both having said magnet in common with each other, an armature for said electromagnet and a diaphragm operatively connected with said armature, one of said coils being adapted to polarize the said electromagnet and the other of said coils being divided into a plurality of groups of turns adapted to produce opposing magnetic fluxes, the divided coil having a small number of turns and being adapted to operate as a transmitting coil and the polarizing coil having a large number of windings and being adapted to operate as a receiving coil, and a switching device for suitably connecting said divided groups of coils, to produce the desired direction of the magnetic fluxes.

3. In a sound signalling equipment, an apparatus comprising an electromagnet and two exciting coils, both having said magnet in common with each other, an armature for said electromagnet and a diaphragm operatively connected with said armature, one of said coils being undivided and having a large number of turns and the other coil having a small number of turns, divided into a plurality of groups and being adapted to operate as a transmitting coil, leads from the groups of turns and from the undivided coil extending out of the apparatus, a source of alternating current, a source of continuous current, a detecting device, and a switching device connected to the said leads and adapted to connect the said groups of turns of the divided coil in opposition and to the source of alternating current to produce opposing fluxes in said coils when the apparatus is used for sending, and also adapted to connect the said groups to the detecting device so as to produce cooperating fluxes, said device being also adapted to connect the said undivided coil to the source of continuous current when the apparatus is used for receiving.

4. In a sound signalling equipment, an apparatus comprising an electromagnet core system, two exciting coils having said system in common with each other, an armature for said electromagnet and a diaphragm operatively connected with said armature, one of said coils being undivided and having a large number of turns and the other coil having a small number of turns divided into a plurality of groups all placed in the same winding space and on the same core portion of said electromagnet system and being adapted to operate as a transmitting coil, leads from the groups of turns and from the undivided coil extending out of the apparatus, a source of alternating current, a source of continuous current, a detecting device, and a switching device connected to said leads and adapted to connect said groups of turns of the divided coil to the source of alternating current so as to produce opposing fluxes when the apparatus is used for sending, and also adapted to connect the said groups to the detecting device so as to produce cooperating fluxes, and to connect said undivided coil to the source of continuous current when the apparatus is used for receiving.

In testimony whereof I affix my signature.

WALTER HAHNEMANN.